US007216819B2

(12) United States Patent
Bernards

(10) Patent No.: US 7,216,819 B2
(45) Date of Patent: May 15, 2007

(54) SPRINKLER HEAD VEGETATION SHIELD

(76) Inventor: Boris Bernards, 22035 Vincennes St., Chatsworth, CA (US) 91311

( * ) Notice: Subject to any disclaimer, the term of this patent is extended or adjusted under 35 U.S.C. 154(b) by 20 days.

(21) Appl. No.: 10/821,534

(22) Filed: Apr. 8, 2004

(65) Prior Publication Data

US 2004/0217195 A1 Nov. 4, 2004

Related U.S. Application Data

(60) Provisional application No. 60/461,892, filed on Apr. 9, 2003.

(51) Int. Cl.
*B05B 1/28* (2006.01)
*B05B 15/04* (2006.01)
*A01G 25/06* (2006.01)
*B05B 15/06* (2006.01)

(52) U.S. Cl. .................. 239/288.5; 239/288; 239/201; 239/203

(58) Field of Classification Search ................ 239/210, 239/276, 288.3, 288, 288.5, 201, 203, 204, 239/205, 207; 206/476, 487, 815, 816
See application file for complete search history.

(56) References Cited

U.S. PATENT DOCUMENTS

| | | | | |
|---|---|---|---|---|
| 3,005,287 | A | 10/1961 | Dudley | |
| 3,015,448 | A | 1/1962 | Hurless | |
| 3,018,057 | A * | 1/1962 | Anderson | 239/201 |
| 3,485,449 | A | 12/1969 | Wilson | |
| 3,755,965 | A | 9/1973 | Emery | |
| 3,762,642 | A | 10/1973 | Di Santo | |
| 3,806,096 | A | 4/1974 | Eccleston et al. | |
| 3,830,434 | A * | 8/1974 | Green et al. | 239/562 |
| 3,904,120 | A | 9/1975 | Sbicca | |
| 4,145,003 | A | 3/1979 | Harrison et al. | |
| 4,146,181 | A | 3/1979 | Soos | |
| D256,386 | S * | 8/1980 | Bergland | D23/218 |
| 4,308,688 | A | 1/1982 | Revane | |
| 4,582,256 | A | 4/1986 | Jaquez | |
| 5,037,030 | A | 8/1991 | Apodaca | |
| 5,157,867 | A | 10/1992 | Fritch | |
| 5,211,338 | A * | 5/1993 | Leite et al. | 239/276 |
| 5,213,262 | A | 5/1993 | Violette | |
| 5,772,118 | A * | 6/1998 | Fabiano | 239/276 |
| 5,794,378 | A | 8/1998 | Beatrez | |
| 5,918,814 | A * | 7/1999 | Hough | 239/288 |
| 5,931,385 | A * | 8/1999 | Miller | 239/288 |
| 6,186,416 | B1 * | 2/2001 | Jones | 239/288.5 |
| 6,209,803 | B1 * | 4/2001 | Colo'n | 239/288.5 |

* cited by examiner

*Primary Examiner*—Frederick C. Nicolas
*Assistant Examiner*—James S. Hogan
(74) *Attorney, Agent, or Firm*—Kelly, Lowry & Kelley, LLP

(57) ABSTRACT

A sprinkler head vegetation shield that includes a sloping wall defined by a single-piece curved plate. A lip extends horizontally away from the wall along an upper perimeter thereof for supporting the shield adjacent a sprinkler head without attachment thereto. A notch is located substantially near a lower perimeter of the sloping wall and configured to accommodate movement of the sprinkler head relative to the plate.

2 Claims, 1 Drawing Sheet

SPRINKLER HEAD VEGETATION SHIELD

RELATED APPLICATION

This application claims the benefit of U.S. Provisional Application No. 60/461,892, filed on Month Apr. 9, 2003.

BACKGROUND OF THE INVENTION

The present invention generally relates to lawn sprinkler systems. More particularly, the present invention relates to a protector shield, for lawn sprinkler heads, of various configurations and sizes suited to meet the needs of sprinkler heads in various locations of the lawn and which serve to prevent fouling of the sprinkler head and back splashing on to fencing and walls.

Pop-lawn sprinkler heads are attached to underground water lines, and are normally located below ground level. When the water is turned on, the head pops up out of the ground, so that water can be sprayed onto the lawn.

Oftentimes, such sprinkler heads are protected with a plate or the like to prevent being broken or otherwise damaged by lawnmowers or automobiles.

In the case of residential sprinkler systems, an overriding concern is that grass or weeds, over time, grow around the sprinkler heads. The excessive growth can occur to such a degree that it virtually covers the sprinkler heads and seriously interferes with their proper operation.

It has become an increasing gardening practice to trim around such sprinklers with a cord or spinning weed trimming machine. However, it has been found that such practice make for aesthetically unpleasing areas surrounding the sprinkler head.

Vegetation shields for sprinkler heads are known in the art. However, these are typically complicated in use and installation. Many of these shields are directly attached to the sprinkler itself. Yet others are formed in sections which must be assembled. Most of these shields are not visually appealing.

Another problem with sprinkler systems is that the sprinkler can wet sidewalks which are to be traversed by the homeowner, or wet and discolor adjacent fences or walls. Previous back splash guards have been attached to the sprinkler itself.

Accordingly, there is a continuing need for a sprinkler head vegetation shield which prevents fouling of the sprinkler head by stopping the growth of grass and/or weeds. The sprinkler head shield should be versatile and visually appealing. The sprinkler head shield should also be capable of forming a back splash to prevent discoloring of adjacent walls and fences. The present invention fulfills these needs and provides other related advantages.

SUMMARY OF THE INVENTION

The present invention provides a sprinkler head vegetation shield which prevents fouling of the sprinkler head by stopping the growth of grass and/or weeds. The present invention also provides a sprinkler head shield that is versatile and visually appealing. The present invention further provides a sprinkler head shield capable of forming a back splash to prevent discoloring of walls and fences adjacent to a sprinkler.

The present invention discloses a sprinkler head vegetation shield that includes a sloping wall defined by a single-piece curved plate. A lip extends horizontally away from the wall along an upper perimeter thereof for supporting the shield adjacent a sprinkler head without attachment thereto. A notch is located substantially near a lower perimeter of the sloping wall and configured to accommodate movement of the sprinkler head relative to the plate.

A plurality of apertures spaced about the sloping wall. A plurality of mounting spikes extend through the apertures for securing the plate to a surface. Each spike includes a head larger than the aperture to prevent movement of the plate past the head of the spike.

The shield is at least partially circular and the notch is centrally located with respect to the shield. The wall slopes inwardly towards the notch.

Portions of the wall on opposite sides of the notch extend a distance generally parallel to each other, defining an elongated slot with the notch at one end. An insert is slidable into a groove surrounding the elongated slot.

The at least partially circular shield includes a sloping wall that is generally concave.

The at least partially circular shield includes a notch centrally located with respect to the shield, and the wall slopes outwardly from a center defined by the at least partially circular shield.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
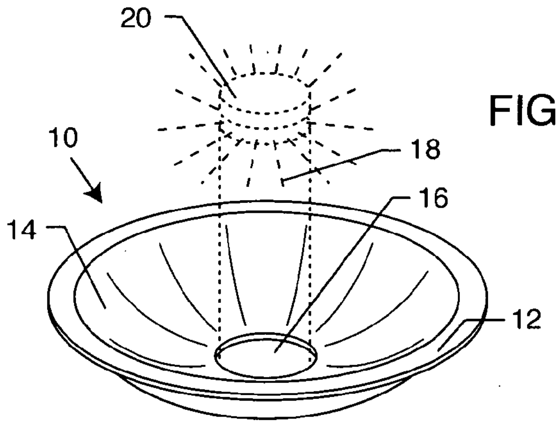
FIG. 1 is a perspective view of a sprinkler head vegetation shield embodying the present invention, illustrating a pop-head sprinkler in phantom.

As shown in the drawings for purposes of illustration, the present invention resides in a sprinkler head vegetation shield and soil retainer which is designed to stop grass, soil and/or weeds from fouling a sprinkler head. The invention is intended to allow mowing up to the shield perimeter, providing a neat appearance to the area immediately surrounding the sprinkler head or stem.

With reference now to FIG. 1, a full circle, bowl-shaped, sprinkler head vegetation shield 10 is illustrated. The shield 10 includes a peripheral lip 12 which is generally horizontal to allow for an area of clear vegetation and a clean edge which serves to anchor the shield 10 and allow the grass surrounding it to be mowed to a clean edge. An inwardly sloping and concave surface 14 extends downwardly from the lip 12 to a central aperture 16. The aperture 16 is sized to allow the stem 18 of a sprinkler head 20 to extend therefrom. Thus, when the sprinkler head 20 is in operation, it extends upwardly from the shield 10. However, when not in operation, the sprinkler head 20 rests in a lower portion of the shield 10.

The shield 10 can be made of weather resistant plastic, stainless steel, brass, fiberglass or other moldable material conducive to outdoor use. Preferably, the shield is of a green color so as to blend in with the surrounding vegetation. However, contrasting colors can be provided, as well as decorative motifs to suit the needs of the owner. The shield 10 illustrated in FIG. 1 is typically used for those sprinkler heads 20 which are disposed within the lawn, thus needing peripheral protection from fouling by grass and the like.

Figure 2:
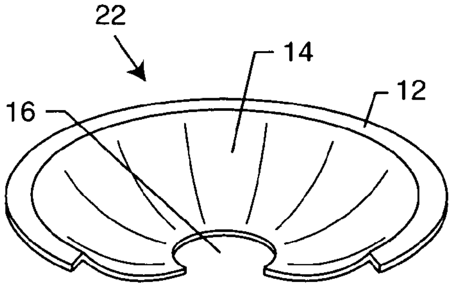
FIG. 2 is another sprinkler head vegetation shield embodying the present invention.
Figure 3:
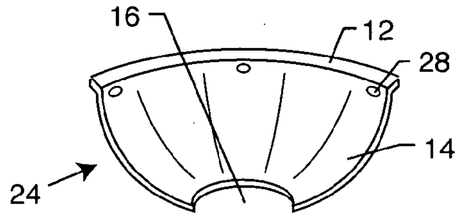
FIG. 3 is yet another sprinkler head vegetation shield embodying the present invention, and having apertures for the insertion of stakes therethrough.
Figure 4:
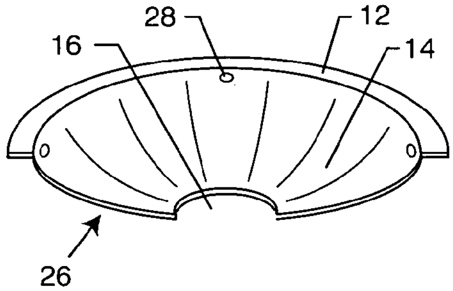
FIG. 4 is yet another sprinkler head vegetation shield embodying the present invention.

With reference now to FIGS. 2–4, if the sprinkler head 20 is disposed in a corner of the lawn, or other peripheral edge, the shield 22–26 may be sized and configured to accommodate such placement. All of the shields incorporate the lip 12 for the benefits described above. Also, the shields include the aperture or notch 16 sized to fit around the pipe or stem of the sprinkler head 20, and in the case of pop-up sprinklers, allow the stem 18 and sprinkler head 20 to extend upwardly therefrom. A shown in FIGS. 1–4, depth of the shields 10 and 22–26 and degree of slope of internal wall 14 can be varied to accommodate the needs of the particular location.

Preferably, as illustrated in FIGS. 3 and 4, the shield includes one or more apertures 28 for anchoring the shield to the ground or surface with a thin stake or needle having a small flat round head (not shown) to limit the entry of the stake into the ground, yet hold the shield tight to the surrounding surface. Use of the peripheral lip 12 and stakes within the apertures 28 secure the shield to the ground. Yet, if a shield needs to be replaced or otherwise removed, such removal is relatively easy as there is no attachment to the sprinkler itself.

Figure 5:
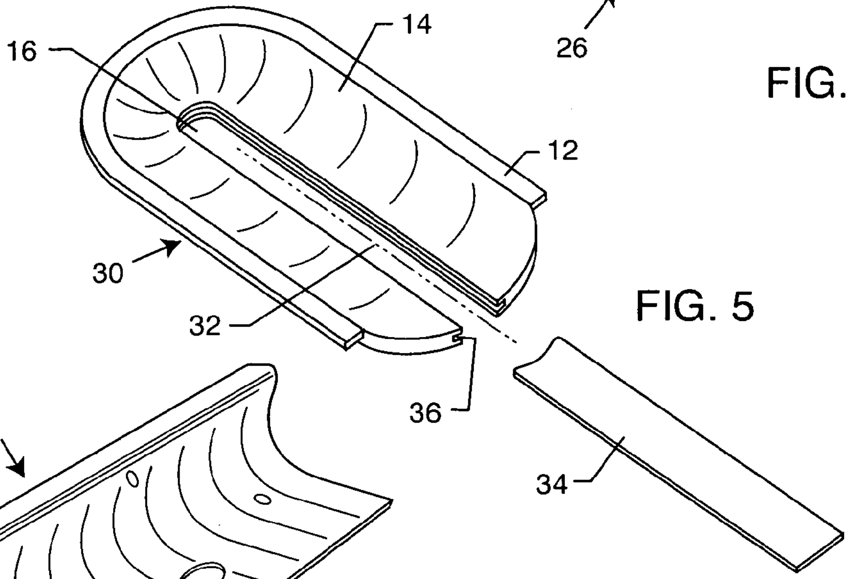
FIG. 5 is an elongated sprinkler head vegetation shield embodying the present invention.

With reference now to FIG. 5, a shield 30 is illustrated which is of an elongated or elliptical nature. The shield 3 also includes the lip 12 and sloping wall 14. Typically, the shields of the present invention are intended to be positioned close to an area of concrete, such as a pathway or concrete so that the shield abuts the concrete while cradling the sprinkler head. However, if this is not possible, the elongated shield 30 illustrated in FIG. 5 can be used. The shield 30 can be trimmed to any length to suit the distance of the sprinkler head from the edge of the concrete, or other obstruction. The shield 30 illustrated in FIG. 5 is particularly versatile as it includes an elongated open-faced slot 32 which is sized and configured so as to receive the pipe or shaft of the sprinkler. An insert 34 can then be slid into a groove 36 surrounding the slot 32 to create an aperture 16 around the pipe or stem of the sprinkler head. The shield 30 can then be trimmed to the appropriate dimension.

Figure 6:
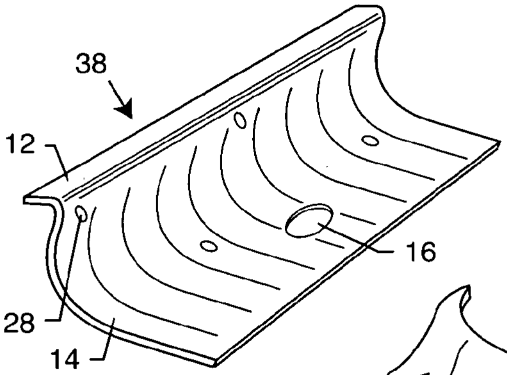
FIG. 6 is a straight and continuous sprinkler head vegetation shield used in accordance with the present invention.
Figure 7:
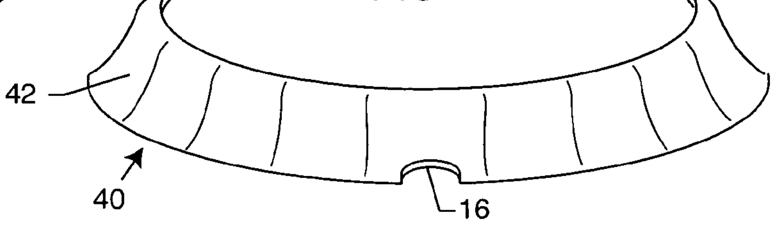
FIG. 7 is yet another embodiment of a sprinkler head vegetation shield embodying the present invention.

With reference now to FIGS. 6 and 7, shields 38 and 40 of yet other configurations and sizes are illustrated. The shield 38 illustrated in FIG. 6 includes the aforementioned lip 12, apertures 28, and inwardly directed wall 14. Such a seal 38 can be used at the periphery of the lawn having a pop-up sprinkler or elevated sprinkler extending through aperture 16. The shield 38 can also serve as a back splash to prevent water from staining a fence or wall. The shield 40 illustrated in FIG. 7 can also serve such purposes while having a wall 42 which extends generally outwardly, and to a height to prevent back splashing.

It will be appreciated by the reader that the invention is not limited by size or configuration, but can be designed to accommodate the placement of virtually any sprinkler head. The shields of the present invention allow mowing up to the peripheral edge or lip 12 of the shield to create a very neat and clean cut edge. The shields of the present invention also prevent grass, soil and weeds from growing over the sprinkler head and preventing its optimal operation. The shields are especially useful on slopes. The shields of the present invention can also be extended in height, in some cases, in order to protect the spray back splash from the sprinkler to avoid discoloration of a fence or wall area adjacent to the sprinkler head. It should also be appreciated that the shields of the present invention can also be utilized for other purposes, such as drainage outlets that are let into the ground, in order to avoid grass or weed fouling of the drainage outlet and allowing for neat mowing surrounding outlet. For example, the invention may be used as grass and weed repressants around flag poles, tubular fence posts (and other cross-sectional shapes), letter box posts and other ground inserts or protrusions where neatness and edge trimming ability is required.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A sprinkler head vegetation shield, comprising, a sloping wall defined by a single-piece curved plate;

a lip extending horizontally away from the wall along an upper perimeter thereof for supporting the shield adjacent a sprinkler head without attachment thereto; and a notch located substantially near a lower perimeter of the sloping wall and configured to accommodate movement of the sprinkler head relative to the plate;

wherein the shield is at least partially circular and the sloping wall is generally concave; and wherein portions of the wall on opposite sides of the notch extend a distance generally parallel to each other, defining an elongated slot with the notch at one end.

2. The sprinkler shield of claim 1, including an insert slidable into a groove surrounding the elongated slot.

* * * * *